United States Patent
Seki et al.

(10) Patent No.: US 9,543,588 B2
(45) Date of Patent: Jan. 10, 2017

(54) ALUMINUM ALLOY FOIL FOR ELECTRODE COLLECTORS AND PRODUCTION METHOD THEREFOR

(75) Inventors: Masakazu Seki, Chiyoda-ku (JP); Satoshi Suzuki, Chiyoda-ku (JP); Kenji Yamamoto, Chuo-ku (JP); Tomohiko Furutani, Chuo-ku (JP)

(73) Assignees: UACJ Corporation, Tokyo (JP); UACJ Foil Corporation, Tokyo (JP)

( * ) Notice: Subject to any disclaimer, the term of this patent is extended or adjusted under 35 U.S.C. 154(b) by 118 days.

(21) Appl. No.: 14/235,653

(22) PCT Filed: Jul. 29, 2011

(86) PCT No.: PCT/JP2011/067477
§ 371 (c)(1),
(2), (4) Date: Jan. 28, 2014

(87) PCT Pub. No.: WO2013/018162
PCT Pub. Date: Feb. 7, 2013

(65) Prior Publication Data
US 2014/0178709 A1    Jun. 26, 2014

(51) Int. Cl.
*H01M 4/66* (2006.01)
*B21B 1/40* (2006.01)
*C22C 1/02* (2006.01)
*C22C 21/00* (2006.01)
*C22F 1/04* (2006.01)
*B22D 11/06* (2006.01)
*B22D 11/12* (2006.01)
*B22D 25/04* (2006.01)
*C22F 1/00* (2006.01)
*B23K 35/28* (2006.01)
*B23K 35/02* (2006.01)
*H01G 11/68* (2013.01)
*H01M 10/052* (2010.01)

(52) U.S. Cl.
CPC ............... *H01M 4/662* (2013.01); *B21B 1/40* (2013.01); *B22D 11/0622* (2013.01); *B22D 11/1206* (2013.01); *B22D 25/04* (2013.01); *B23K 35/0233* (2013.01); *B23K 35/286* (2013.01); *C22C 1/026* (2013.01); *C22C 21/00* (2013.01); *C22F 1/00* (2013.01); *C22F 1/04* (2013.01); *H01G 11/68* (2013.01); *H01M 10/052* (2013.01); *Y02E 60/13* (2013.01); *Y02T 10/7011* (2013.01); *Y02T 10/7022* (2013.01); *Y10T 428/12431* (2015.01)

(58) Field of Classification Search
None
See application file for complete search history.

(56) References Cited

FOREIGN PATENT DOCUMENTS

| JP | 63-018041 A | 1/1988 |
|---|---|---|
| JP | 04-041645 A | 2/1992 |
| JP | 04-062819 A | 2/1992 |
| JP | 11-162470 A | 6/1999 |
| JP | 11-219709 A | 8/1999 |
| JP | 2002-129269 A | 5/2002 |
| JP | 2004-207117 A | 7/2004 |
| JP | 207117 A | 7/2004 |
| JP | 2008-095142 A | 4/2008 |
| JP | 2008-150651 A | 7/2008 |
| JP | 2010-043333 A | 2/2010 |
| JP | 2010043333 * | 2/2010 |
| JP | 2011-089196 A | 5/2011 |
| WO | 2012/086448 A1 | 6/2012 |

OTHER PUBLICATIONS

JP 2010-043333—Translation.*
Japanese Office Action mailed Jul. 7, 2015, issued in corresponding Japanese Application No. 2013-526630, filed Jun. 24, 2013, 4 pages.
Aluminium Handbook, issued by Japan Aluminium Association, Jan. 31, 2007, 4 pages. English translation of relevant portions of Aluminium Handbook in Japanese Information Statement, filed herewith.
Ashizawa, K., and K. Yamamoto, "Aluminum Foil for Lithium-Ion Battery," Furukawa-Sky Review No. 5, Apr. 2009, 6 pages.
Japanese Information Statement, submission of reason details, filed by a third party Apr. 24, 2015, 12 pages.
Extended European Search Report mailed Feb. 26, 2015, issued in corresponding European Application No. 11 87 0485.7, filed Jul. 29, 2011, 5 pages.
International Search Report mailed Oct. 25, 2011, issued in corresponding International Application No. PCT/JP2011/067477, filed Jul. 29, 2011, 2 pages.

* cited by examiner

*Primary Examiner* — Ladan Mohaddes
(74) *Attorney, Agent, or Firm* — Christensen O'Connor Johnson Kindness PLLC

(57) ABSTRACT

An object of the present invention is to provide an aluminum alloy foil for an electrode current collector, the foil having a high strength after the drying step while keeping a high electrical conductivity. Disclosed is a method for manufacturing an aluminum alloy foil for electrode current collector, including: maintaining an aluminum alloy ingot comprising 0.1 to 0.5% of Fe, 0.01 to 0.3% of Si, 0.01 to 0.2% of Cu, 0.01% or less of Mn, with the rest being Al and unavoidable impurities, at 550 to 620° C. for 1 to 20 hours, and subjecting the resulting ingot under a hot rolling with a starting temperature of 500° C. or higher and an end-point temperature of 255 to 300° C.

2 Claims, No Drawings

ALUMINUM ALLOY FOIL FOR ELECTRODE COLLECTORS AND PRODUCTION METHOD THEREFOR

TECHNICAL FIELD

The present invention relates to electrode current collectors used for secondary batteries, electric double-layer capacitors, lithium-ion capacitors, etc., and more particularly to aluminum alloy foils used for a positive electrode material of lithium-ion secondary batteries. The present invention further relates to an aluminum alloy foil used for an negative electrode material of lithium-ion secondary batteries.

BACKGROUND ART

Lithium-ion secondary batteries with high energy densities have been used as power sources for portable electronics such as a mobile phone and a notebook computer.

An electrode member of a lithium-ion secondary battery includes a positive electrode plate, a separator, and a negative electrode plate. Regarding a positive electrode material, an aluminum alloy foil has been used as a support, having excellent electrical conductivity and less heat generation without affecting electrical efficiency of a secondary battery. An active material having a lithium-containing metal oxide such as $LiCoO_2$ as a chief component is applied on a surface of the aluminum alloy foil. Its production process includes: applying an active material with a thickness of about 100 µm on both sides of an aluminum alloy foil with a thickness of about 20 µm; and drying the active material to remove a solvent therefrom. Further, in order to increase the density of the active material, compression forming is performed with a pressing machine (hereinafter, this step of compression forming performed with a pressing machine is referred to as press working). The positive electrode plate as so manufactured, a separator, and a negative electrode plate are stacked, and then the resulting stack is wound. After a shaping process is performed so as to encase the stack, it is encased.

An aluminum alloy foil used for a positive electrode material of a lithium-ion secondary battery has several problems that cuts occur during application of an active material and that ruptures occur at a bending portion during winding. Thus, a higher strength is required. At a drying step after the application of the active material (hereinafter referred to as "drying step"), heat treatment is carried out at about 100 to 180° C. Accordingly, a lower strength after the drying step is likely to generate middle waviness during press working. This induces wrinkles during winding, which reduces adhesion between the active material and the aluminum alloy foil. Besides, a rupture is likely to occur during a slitting process. When the adhesion between the active material and a surface of the aluminum alloy foil decreases, their detachment is facilitated during repeated operation of discharge and charge. Unfortunately, this causes its battery capacity to decrease.

Recently, a high electrical conductivity has also been required for an aluminum alloy foil used for a positive electrode material of a lithium-ion secondary battery. What is meant by the electrical conductivity refers to physical property indicating how easily electricity is conducted in a substance. The higher the electrical conductivity is, the more easily the electricity is conducted. Lithium-ion secondary batteries used for automobiles and/or electric tools necessitate a higher output characteristic than lithium-ion secondary batteries used for consumer-use mobile phones and/or notebook computers. When a large current flows, a lower electrical conductivity causes internal resistance of a battery to increase. Consequently, this reduces its output voltage.

3003 Alloy is generally used as the aluminum alloy foil for lithium ion secondary batteries having high strength. 3003 Alloy is characterized by its high strength due to the addition of elements such as Si, Fe, Mn, Cu and the like. In particular, since Mn forms solid solution and precipitates finely, decrease in strength during heat treatment is small. However, since Mn solid solution decreases conductivity, the conductivity of 3003 alloy is extremely low when compared with the conductivity of an aluminum alloy having aluminum purity of 99% or higher. In conclusion, 3003 alloy has difficulty in satisfying both of the high strength and the high conductivity that are required in the aluminum alloy foil for lithium ion secondary batteries.

Patent Literature 1 discloses an aluminum alloy foil for battery current collector having a tensile strength of 98 MPa or higher. Patent Literature 2 discloses an aluminum alloy foil for an electrode current collector of lithium ion secondary batteries having a tensile strength of 200 MPa or higher. However, Patent Literature 1 and Patent Literature 2 both do not mention of the conductivity.

Patent Literature 3 discloses a method for preventing plastic deformation and for preventing the detachment of the active material during the press working, by enhancing the strength of the aluminum alloy foil. However, the aluminum alloy foil disclosed is an alloy added with Mn, Cu, Mg as the main element, and thus cannot satisfy the required high electrical conductivity.

Patent Literature 4 discloses an aluminum alloy sheet, the solid solution content of Fe being less than 50 ppm, the thickness of the sheet being 0.1 to 2 mm, and the tensile strength being 145 to 200 MPa. However, the thickness of the sheet being such prohibits the application as an electrode current collector. Further, since the solid solution content of Fe is low, the strength of the alloy extremely decreases when heat treatment at 120 to 160° C. is performed for 15 minutes to 24 hours.

CITATION LIST

Patent Literature

[Patent Literature 1] JP 2004-207117A
[Patent Literature 2] JP H11-219709A
[Patent Literature 3] JP 2008-150651A
[Patent Literature 4] JP 2002-129269A

SUMMARY OF INVENTION

Technical Problem

As mentioned above, conventional techniques have failed to obtain an aluminum alloy foil for an electrode current collector of electrodes having sufficient properties of both the strength and the electrical conductivity.

The present invention has been made by taking the aforementioned circumstances into consideration. An object of the present invention is to provide an aluminum alloy foil for an electrode current collector, the foil having a high strength after the drying step while keeping a high electrical conductivity.

Solution to Problem

The present inventors have made an investigation regarding the aluminum alloy foil used for the positive electrode materials of the lithium-ion secondary batteries. Accordingly, the present inventors have found that high electrical conductivity and high strength after the heat treatment during the drying step after the application of the active material can be maintained, by controlling the solid solution precipitation conditions for their elements, which is achieved by regulating the content of the component within an appropriate range and by optimizing the temperature applied during the homogenization treatment of the ingot and during the hot rolling.

That is, the first aspect of the present invention is an aluminum alloy foil for electrode current collector, comprising:

0.1 to 0.5 mass % (hereinafter referred to as %) of Fe, 0.01 to 0.3% of Si, 0.01 to 0.2% of Cu, 0.01% or less of Mn, with the rest consisting of Al and unavoidable impurities, wherein tensile strength of the aluminum alloy foil is 220 MPa or higher, 0.2% yield strength of the aluminum alloy foil is 180 MPa or higher, and electrical conductivity of the aluminum alloy foil is 58% IACS or higher.

The second aspect of the present invention is the aluminum alloy foil for electrode current collector as described above, wherein solid solution content of Fe is 100 ppm or higher,
solid solution content of Si is 80 to 1800 ppm, and
solid solution content of Cu is 80 to 1500 ppm.

The third aspect of the present invention is the aluminum alloy foil for electrode current collector as described above, wherein the tensile strength and the 0.2% yield strength after performing either one of heat treatments of 24 hours at 120° C., 3 hours at 140° C. or 15 minutes at 160° C., is 190 MPa or higher and 160 MPa or higher, respectively.

The fourth aspect of the present invention is a method for manufacturing the aluminum alloy foil for electrode current collector as described above, comprising the steps of:

maintaining an aluminum alloy ingot comprising 0.1 to 0.5% of Fe, 0.01 to 0.3% of Si, 0.01 to 0.2% of Cu, 0.01% or less of Mn, with the rest consisting of Al and unavoidable impurities, at 550 to 620° C. for 1 to 20 hours, and subjecting the resulting ingot under a hot rolling with a starting temperature of 500° C. or higher and an end-point temperature of 255 to 300° C.

The first through the fourth aspects of the present invention can be combined as necessary.

The following points were considered to be particularly important when achieving the present invention. That is, all of three temperature conditions of (1) homogenization heating treatment shall be carried out at 550 to 620° C. for 1 to 20 hours, (2) the starting temperature of the hot rolling shall be 500° C. or higher, and (3) the end-point temperature of the hot rolling shall be 255 to 300° C. need be satisfied. When any one of these temperature conditions cannot be met, an aluminum alloy foil for electrode current collector having superior characteristics in both of the strength and the electrical conductivity cannot be obtained. It became apparent that only when these temperature conditions are met, Fe, Si, and Cu in the aluminum alloy foil forms sufficient solid solution, thereby providing an aluminum alloy foil with high strength and high electrical conductivity.

Among these three conditions, the most important condition is to keep the end-point temperature of the hot rolling in the range of 255 to 300° C. When the end-point temperature of the hot rolling is not in this range, decrease in production efficiency of the aluminum foil and decrease in the strength of the aluminum foil occur.

Advantageous Effects of Invention

According to the present invention, an aluminum alloy foil for an electrode current collector, such as an aluminum alloy foil for lithium ion batteries, having a high electrical conductivity as well as high strength after drying process can be provided. Such aluminum alloy foil is resistant from generation of middle waviness during press working, thereby preventing detachment of the active material and raptures during a slitting process.

DESCRIPTION OF EMBODIMENTS

< Composition of Aluminum Alloy Foil>

The aluminum alloy foil for lithium ion batteries according to the present invention comprises: 0.1 to 0.5% of Fe, 0.01 to 0.3% of Si, 0.01 to 0.2% of Cu, 0.01% or less of Mn, with the rest consisting of Al and unavoidable impurities.

Si is an element that increases strength by addition thereof, and 0.01 to 0.3% of Si is included. When the additive amount of Si is less than 0.01%, there is no contribution to the improvement in strength. In addition, Si is included in a common Al base metal as impurities. As a result, in order to recovery the amount to less than 0.01%, a high-purity base metal should be used. This is difficult to achieve in view of economic reasons. In contrast, when the additive amount of Si exceeds 0.3%, Al—Fe—Si compound becomes well observed in and at the surface of the aluminum alloy foil, which leads to unfavorable phenomena of increased generation of pinholes.

Fe is an element that increases strength by addition thereof, and 0.1 to 0.5% of Fe is included. When the additive amount of Fe is less than 0.1%, there is no contribution to the improvement in strength. In contrast, when the additive amount of Fe exceeds 0.5%, Al—Fe compound or Al—Fe—Si compound becomes well observed in and at the surface of the aluminum alloy foil, which leads to unfavorable phenomena of increased generation of pinholes.

Cu is an element that increases strength by addition thereof, and 0.01 to 0.2% of Cu is included. When the additive amount of Cu is less than 0.01%, the solid solution content of Cu decreases, which leads to decrease in strength. In contrast, when the additive amount of Cu exceeds 0.2%, work hardening increases, thereby becoming prone to cut during the foil rolling.

The amount of Mn contained is controlled to be 0.01% or less, since even when only a minute amount of Mn is contained in the aluminum alloy, it forms solid solution in the aluminum alloy and leads to a large decrease in the electrical conductivity. When the amount of Mn contained exceeds 0.01%, it becomes difficult to maintain the high electrical conductivity.

With regard to other points, a material of an embodiment of the present invention contains unavoidable impurities such as Cr, Ni, Zn, Mg, Ti, B, V, and/or Zr. An amount of each of the unavoidable impurities is preferably 0.02% or less, and a total amount thereof is preferably 0.15% or less.

<Solid Solution Content>

Solid solution of Fe formed in aluminum improves the strength of the aluminum. The content is preferably 100 ppm or higher. When the content of Fe is lower than 100 ppm, there is little contribution to the improvement in strength. There is no particular upper limit for the content of Fe, however, it is preferably 300 ppm or lower since the electrical conductivity decreases when the content of Fe becomes too large.

Solid solution of Si formed in aluminum improves the strength of the aluminum. The content is preferably 80 to 1800 ppm. When the content of Si is lower than 80 ppm, there is little contribution to the improvement in strength, and it is also economically difficult to achieve such content since it would require the use of bare metal with high purity. When the content of Si exceeds 1800 ppm, work hardening becomes too high, and thus the alloy becomes prone to cut during the foil rolling.

Solid solution of Cu formed in aluminum improves the strength of the aluminum. The content is preferably 80 to 1500 ppm. When the content of Cu is lower than 80 ppm, there is little contribution to the improvement in strength. When the content of Cu exceeds 1500 ppm, work hardening becomes too high, and thus the alloy becomes prone to cut during the foil rolling.

<Original Sheet Strength>

With regard to an aluminum alloy primarily containing Fe, Si and Cu, when the temperature conditions for the homogenization treatment and the hot rolling are optimized, allowing each of the elements to form solid solution as much as possible, dislocation movement can be reduced, thereby achieving higher strength. Further, as the content of the solid solution increase, work hardening during processing increase. Accordingly, strength of the aluminum alloy foil can be further improved by cold rolling and foil rolling.

Tensile strength of an original sheet after final cold rolling should be 220 MPa or higher. Then, 0.2% yield strength thereof should be 180 MPa or higher. When the tensile strength is less than 220 MPa and the 0.2% yield strength is less than 180 MPa, the strength is insufficient. Consequently, tension imposed during application of an active material is likely to produce cuts and cracks. In addition, the above causes defects such as middle waviness, exerts adverse effects on its productivity, and is thus not preferred.

<Strength After Heat Treatment>

A step of manufacturing a positive electrode plate includes a drying step after application of an active material so as to remove a solvent from the active material. At this drying step, heat treatment is carried out at a temperature of about 100 to 180° C. This heat treatment may cause a change in mechanical property because an aluminum alloy foil is softened. Thus, the mechanical property of the aluminum alloy foil after the heat treatment is critical. During heat treatment at 100 to 180° C., external heat energy activates dislocation and facilitates its movement. This decreases strength in the course of recovery thereof. In order to prevent the strength decrease in the course of the recovery during the heat treatment, reducing the dislocation movement by using solid-solution elements or precipitates in the aluminum alloy is effective. In an aluminum alloy primarily containing Fe, Si, and Cu, in particular, a solid solution content of Fe has a large effect. Specifically, more Fe can form solid solution by increasing a temperature of homogenizing treatment of an ingot. Then, during hot rolling, the resulting Fe solid solution should not be subject to precipitation as much as possible, and an increased solid solution content should be maintained. This can reduce the strength decrease by the heat treatment.

In the present invention, in order to achieve tensile strength of 190 MPa or higher and 0.2% yield strength of 160 MPa or higher after heat treatment at 120° C. for 24 hours, at 140° C. for 3 hours, or at 160° C. for 15 minutes, conditions for the homogenizing treatment and for the hot rolling are regulated. If the tensile strength is less than 190 MPa or the 0.2% yield strength is less than 160 MPa after the heat treatment, middle waviness is likely to occur during press working after the drying step. This causes wrinkles during winding, and readily generates detachment of an active material and ruptures during a slitting process. The above strengths are therefore not preferred.

<Electrical Conductivity>

Electrical conductivity should be 58% IACS or higher. The electrical conductivity represents a solid solution state of a solute element. An electrode current collector according to an embodiment of the present invention may be used for a lithium-ion secondary battery. In that case, when a discharge rate exceeds 5C, which is a high current level, electrical conductivity of less than 58% IACS is not preferable because its battery capacity decrease. Note that the "1C" means a current level to complete, in one hour, the discharge from a cell having the nominal capacity value when a constant current at the current level is discharged from the cell.

<Method for Manufacturing Aluminum Alloy Foil>

The following steps are used to manufacture an aluminum alloy ingot having the above alloy composition according to an embodiment of the present invention.

The aluminum alloy having the above composition can be used to prepare an ingot after casting in accordance with a common procedure. Examples of the procedure used for their manufacturing include semi-continuous casting and continuous casting. The aluminum alloy cast ingot is subjected to homogenizing treatment at 550 to 620° C. for 1 to 20 hours.

When the temperature of the homogenizing treatment is lower than 550° C. or the holding time is less than 1 hour, elements such as Si and Fe cannot form solid solution sufficiently, resulting in low strength. The above condition is thus not preferred. When the temperature exceeds 620° C., the ingot melts locally. In addition, a tiny amount of hydrogen gas mixed in during casting appears on the surface, thereby readily causing swelling on the material surface. The above condition is thus not preferred. Also, when the homogenizing treatment period exceeds 20 hours, the effect becomes saturated, leading to decrease in productivity and increase in cost.

The above homogenizing treatment is followed by hot rolling, cold rolling, and foil rolling to produce an aluminum alloy foil with a thickness of 6 to 30 μm. The hot rolling starts at a temperature of 500° C. or higher after the homogenizing treatment. When the hot rolling has a starting temperature of lower than 500° C., a precipitation amount of elements such as Si and Fe increases. Consequently, it is difficult to preserve a solid solution content to improve its strength. The solid solution content of Fe, in particular, has a large impact on maintenance of high strength. When the temperature ranges from 350 to 500° C., Fe is susceptible to precipitation as $Al_3Fe$ or an intermetallic compound for Al—Fe—Si series. Thus, a time going through this temperature range should be as short as possible. During the hot rolling, in particular, a time going through a temperature range from 350 to 500° C. is preferably within 20 minutes.

The end-point temperature of the hot rolling may be 255 to 300° C. The end-point temperature at the time of the hot rolling can be determined by changing a line speed and by thus adjusting processing heat and cooling conditions. Note that a hot-rolled aluminum sheet is wound and cooled as a coil at the outlet side of a hot roller.

In order to set the end-point temperature of the hot rolling to be lower than 255° C., the line speed should be markedly decreased to prevent occurrence of the processing heat. This is not preferred because the productivity decreases. When the end-point temperature of the hot rolling exceeds 300° C., aluminum recrystallization proceeds inside the coil during cooling. Accordingly, accumulated strain is reduced and the strength is lowered. More preferably, the temperature range is set to be from 255 to 285° C.

After the hot rolling, cold rolling is performed. Here, it is preferable that intermediate annealing is not performed before or in the midst of the cold rolling. When the intermediate annealing is performed, the strain accumulated during the hot rolling and the cold rolling before the intermediate annealing is released, resulting in low strength. In addition, Fe which have formed solid solution during the homogenizing treatment and the hot rolling precipitate. Accordingly, the solid solution content would decrease, and the strength after heat treatment at 120 to 160° C. for 15 minutes to 24 hours would also decrease.

casting to prepare ingots with a thickness of 500 mm. Next, those ingots were subjected to surface finishing, followed by homogenizing treatment under conditions designated in Table 1. Then, hot rolling was performed to produce sheets with a thickness of 3.0 mm. In Examples 1 to 4 and 6 to 14, intermediate annealing was not performed, while cold rolling and foil rolling were performed continuously. In this manner, aluminum alloy foil with a thickness of 12 μm was obtained. In Example 5, hot rolling was performed, followed by cold rolling to obtain an aluminum foil with a thickness of 0.8 mm, and then intermediate annealing was performed at 490° C. for 4 hours. Subsequently, cold rolling and foil rolling was performed continuously, and aluminum alloy foil with a thickness of 12 μm was obtained. In Comparison Examples 15 to 24, aluminum alloy foils were obtained by a production process similar to those of the above-mentioned Examples.

TABLE 1

| | | Chemical Component (mass %) | | | | Homogenizing Treatment Condition | | Hot Rolling Condition | | | |
|---|---|---|---|---|---|---|---|---|---|---|---|
| | | | | | | | | Starting | End-point | Intermediate | Foil |
| | No. | Si | Fe | Cu | Mn | Al and Unavoidable Impurities | Temperature (° C.) | Period (hr) | Temperature (° C.) | Temperature (° C.) | Annealing Condition | Thickness (μm) |
| Example | 1 | 0.01 | 0.14 | 0.14 | 0.0046 | Rest | 620 | 3 | 550 | 255 | None | 12 |
| | 2 | 0.08 | 0.10 | 0.16 | 0.0033 | Rest | 620 | 3 | 550 | 255 | None | 12 |
| | 3 | 0.13 | 0.46 | 0.01 | 0.0029 | Rest | 620 | 3 | 550 | 255 | None | 12 |
| | 4 | 0.13 | 0.43 | 0.02 | 0.0057 | Rest | 610 | 6 | 550 | 270 | None | 12 |
| | 5 | 0.13 | 0.43 | 0.02 | 0.0057 | Rest | 610 | 6 | 550 | 270 | 490° C. × 4 hr | 12 |
| | 6 | 0.18 | 0.37 | 0.11 | 0.0031 | Rest | 610 | 6 | 550 | 270 | None | 12 |
| | 7 | 0.20 | 0.41 | 0.18 | 0.0045 | Rest | 610 | 6 | 550 | 270 | None | 12 |
| | 8 | 0.14 | 0.47 | 0.03 | 0.0047 | Rest | 580 | 6 | 530 | 270 | None | 12 |
| | 9 | 0.08 | 0.37 | 0.11 | 0.0023 | Rest | 580 | 6 | 530 | 280 | None | 12 |
| | 10 | 0.08 | 0.37 | 0.11 | 0.0023 | Rest | 580 | 6 | 530 | 295 | None | 12 |
| | 11 | 0.14 | 0.49 | 0.19 | 0.0045 | Rest | 580 | 6 | 500 | 290 | None | 12 |
| | 12 | 0.30 | 0.42 | 0.08 | 0.0051 | Rest | 550 | 10 | 500 | 300 | None | 12 |
| | 13 | 0.24 | 0.50 | 0.11 | 0.0037 | Rest | 550 | 10 | 500 | 300 | None | 12 |
| | 14 | 0.17 | 0.41 | 0.20 | 0.0063 | Rest | 550 | 10 | 530 | 300 | None | 12 |
| Comparative Example | 15 | 0.60 | 0.98 | 0.10 | 0.0045 | Rest | 580 | 3 | 530 | 260 | None | 12 |
| | 16 | 0.18 | 1.45 | 0.07 | 0.0054 | Rest | 580 | 3 | 530 | 260 | None | 12 |
| | 17 | 0.04 | 0.09 | 0.03 | 0.0015 | Rest | 580 | 3 | 530 | 260 | None | 12 |
| | 18 | 0.17 | 0.48 | 0.30 | 0.0017 | Rest | 580 | 3 | 530 | 260 | None | 12 |
| | 19 | 0.21 | 0.41 | 0.06 | 0.06 | Rest | 580 | 3 | 530 | 260 | None | 12 |
| | 20 | 0.17 | 0.41 | 0.001 | 0.0013 | Rest | 580 | 3 | 530 | 260 | None | 12 |
| | 21 | 0.09 | 0.38 | 0.05 | 0.0024 | Rest | 580 | 3 | 450 | 260 | None | 12 |
| | 22 | 0.09 | 0.38 | 0.05 | 0.0024 | Rest | 520 | 3 | 500 | 260 | None | 12 |
| | 23 | 0.08 | 0.35 | 0.02 | 0.0022 | Rest | 580 | 0.5 | 530 | 260 | None | 12 |
| | 24 | 0.08 | 0.35 | 0.02 | 0.0022 | Rest | 580 | 3 | 530 | 330 | None | 12 |

After the final cold rolling, the aluminum alloy foil should have a thickness of 6 to 30 μm. When the thickness is less than 6 μm, pin holes are likely to occur during foil rolling. This situation is not preferable. When the thickness exceeds 30 μm, the volume and weight of an electrode current collector increase and the volume and weight of an active material decrease in the same occupied space. In the case of a lithium-ion secondary battery, the above is not preferable because a battery capacity decreases.

EXAMPLES

The present invention will be explained in details by referring to the following Examples and Comparison Examples. The Examples, however, are just examples, and thus the present invention shall not be limited to the Examples.

Aluminum alloys having compositions designated in Table 1 were subjected to casting using semi-continuous Next, each aluminum alloy foil was used to prepare a positive electrode material for a lithium-ion secondary battery. PVDF as a binder was added to an active material primarily containing $LiCoO_2$ to yield a positive electrode slurry. This positive electrode slurry was applied on both surfaces of the aluminum alloy foil with a width of 30 mm. Then, the resulting aluminum alloy foil was subjected to heat treatment for drying under three different conditions including 120° C. for 24 hours, 140° C. for 3 hours, and 160° C. for 15 minutes. After that, a roller press machine was used to perform compression forming to increase the density of the active material.

Each aluminum alloy foil as so manufactured was used to measure and evaluate: the tensile strength, 0.2% yield strength, electrical conductivity, solid solution content, number of cuts occurred during foil rolling, and number of pin holes; the tensile strength and 0.2% yield strength after the heat treatment at 120° C. for 24 hours; the tensile strength and 0.2% yield strength after the heat treatment at 140° C.

for 3 hours; and the tensile strength and 0.2% yield strength after the heat treatment at 160° C. for 15 minutes. Table 2 shows the results. In addition, occurrence of cut during the active material application step and the occurrence of detachment of active material were evaluated for each positive electrode materials. Table 3 shows the results.

TABLE 2

| | | | Aluminum Alloy Foil | | | | | | | |
|---|---|---|---|---|---|---|---|---|---|---|
| | | | Original Sheet | | | | | | Cut | Pinhole |
| | | | Tensile | 0.2% Yield | Electrical | Solid Solution Content | | | During | Density |
| | | No. | Strength (N/mm²) | Strength (N/mm²) | Conductivity (% IACS) | Fe (ppm) | Si (ppm) | Cu (ppm) | Foil Rolling | (×10⁻³ pinholes/m²) |
| Example | | 1 | 244 | 209 | 60.8 | 199 | 81 | 1078 | No | 0.3 |
| | | 2 | 242 | 212 | 61.0 | 183 | 533 | 1232 | No | 0.3 |
| | | 3 | 253 | 206 | 59.3 | 214 | 912 | 77 | No | 0.3 |
| | | 4 | 264 | 223 | 59.6 | 207 | 936 | 154 | No | 0.3 |
| | | 5 | 223 | 182 | 60.5 | 103 | 462 | 143 | No | 0.6 |
| | | 6 | 299 | 258 | 59.4 | 188 | 1351 | 772 | No | 0.3 |
| | | 7 | 342 | 294 | 59.6 | 202 | 1444 | 1365 | No | 0.3 |
| | | 8 | 241 | 203 | 59.8 | 156 | 1008 | 231 | No | 0.6 |
| | | 9 | 284 | 238 | 59.1 | 152 | 603 | 827 | No | 0.6 |
| | | 10 | 263 | 219 | 59.3 | 160 | 623 | 788 | No | 0.8 |
| | | 11 | 324 | 281 | 58.8 | 149 | 1006 | 1288 | No | 0.8 |
| | | 12 | 271 | 236 | 60.9 | 132 | 1784 | 564 | No | 0.6 |
| | | 13 | 294 | 251 | 60.5 | 137 | 1615 | 769 | No | 0.8 |
| | | 14 | 326 | 272 | 60.1 | 123 | 1254 | 1462 | No | 0.8 |
| Comparative Example | | 15 | 283 | 246 | 57.6 | 102 | 3523 | 770 | Yes | 2.8 |
| | | 16 | 241 | 202 | 57.3 | 149 | 1296 | 539 | No | 2.2 |
| | | 17 | 197 | 168 | 61.7 | 98 | 288 | 226 | No | 0.3 |
| | | 18 | 351 | 298 | 58.9 | 122 | 1254 | 2421 | Yes | 0.3 |
| | | 19 | 268 | 226 | 57.6 | 127 | 1312 | 276 | No | 0.3 |
| | | 20 | 214 | 179 | 59.7 | 118 | 1194 | 8 | No | 0.3 |
| | | 21 | 188 | 164 | 60.5 | 66 | 547 | 203 | No | 0.6 |
| | | 22 | 206 | 175 | 60.1 | 95 | 648 | 218 | No | 0.6 |
| | | 23 | 195 | 170 | 60.3 | 89 | 513 | 156 | No | 0.6 |
| | | 24 | 177 | 155 | 60.6 | 48 | 421 | 142 | No | 0.3 |

| | | | Heating at 120° C. for 24 Hours | | Heating at 140° C. for 3 Hours | | Heating at 160° C. for 15 Minutes | |
|---|---|---|---|---|---|---|---|---|
| | | No. | Tensile Strength (N/mm²) | 0.2% Yield Strength (N/mm²) | Tensile Strength (N/mm²) | 0.2% Yield Strength (N/mm²) | Tensile Strength (N/mm²) | 0.2% Yield Strength (N/mm²) |
| Example | | 1 | 205 | 181 | 219 | 191 | 233 | 201 |
| | | 2 | 204 | 179 | 214 | 186 | 231 | 199 |
| | | 3 | 216 | 177 | 228 | 182 | 238 | 194 |
| | | 4 | 225 | 193 | 237 | 201 | 245 | 207 |
| | | 5 | 192 | 163 | 202 | 168 | 214 | 176 |
| | | 6 | 262 | 222 | 276 | 238 | 284 | 246 |
| | | 7 | 306 | 261 | 317 | 273 | 328 | 281 |
| | | 8 | 202 | 171 | 216 | 185 | 226 | 193 |
| | | 9 | 244 | 202 | 253 | 211 | 265 | 225 |
| | | 10 | 226 | 186 | 234 | 195 | 246 | 207 |
| | | 11 | 285 | 248 | 296 | 261 | 310 | 268 |
| | | 12 | 239 | 208 | 247 | 218 | 256 | 229 |
| | | 13 | 233 | 204 | 251 | 216 | 275 | 225 |
| | | 14 | 286 | 236 | 297 | 244 | 311 | 255 |
| Comparative Example | | 15 | 236 | 207 | 249 | 218 | 261 | 232 |
| | | 16 | 202 | 173 | 216 | 184 | 225 | 193 |
| | | 17 | 161 | 146 | 168 | 152 | 177 | 159 |
| | | 18 | 308 | 262 | 323 | 271 | 332 | 287 |
| | | 19 | 229 | 197 | 244 | 208 | 253 | 216 |
| | | 20 | 188 | 158 | 192 | 161 | 194 | 168 |
| | | 21 | 162 | 141 | 169 | 148 | 174 | 155 |
| | | 22 | 181 | 155 | 184 | 159 | 190 | 165 |
| | | 23 | 169 | 148 | 173 | 150 | 178 | 158 |
| | | 24 | 152 | 139 | 158 | 144 | 166 | 148 |

TABLE 3

| | | Positive Electrode Material | | | | | |
|---|---|---|---|---|---|---|---|
| | | Heating at 120° C. for 24 Hours | | Heating at 140° C. for 3 Hours | | Heating at 160° C. for 15 Minutes | |
| | No. | Cut during Active-material-application Step | Detachment of Active Material | Cut during Active-material-application Step | Detachment of Active Material | Cut during Active-material-application Step | Detachment of Active Material |
| Example | 1 | No | No | No | No | No | No |
| | 2 | No | No | No | No | No | No |
| | 3 | No | No | No | No | No | No |
| | 4 | No | No | No | No | No | No |
| | 5 | No | No | No | No | No | No |
| | 6 | No | No | No | No | No | No |
| | 7 | No | No | No | No | No | No |
| | 8 | No | No | No | No | No | No |
| | 9 | No | No | No | No | No | No |
| | 10 | No | No | No | No | No | No |
| | 11 | No | No | No | No | No | No |
| | 12 | No | No | No | No | No | No |
| | 13 | No | No | No | No | No | No |
| | 14 | No | No | No | No | No | No |
| Comparative Example | 15 | No | No | No | No | No | No |
| | 16 | No | No | No | No | No | No |
| | 17 | Yes | Yes | Yes | Yes | Yes | Yes |
| | 18 | No | No | No | No | No | No |
| | 19 | No | No | No | No | No | No |
| | 20 | Yes | Yes | No | No | No | No |
| | 21 | Yes | Yes | Yes | Yes | Yes | Yes |
| | 22 | Yes | Yes | Yes | Yes | No | No |
| | 23 | Yes | Yes | Yes | Yes | Yes | Yes |
| | 24 | Yes | Yes | Yes | Yes | Yes | Yes |

<Tensile Strength>

The tensile strength of the aluminum alloy foil which had been cut out in a direction of the rolling was measured with an Instron tension tester AG-10kNX, manufactured by Shimadzu Corporation. The measurement was performed under conditions with a test piece size of 10 mm×100 mm, at a chuck distance of 50 mm, and at a crosshead speed of 10 mm/min. In addition, in order to simulate the drying step, heat treatment at 120° C. for 24 hours, at 140° C. for 3 hours, or at 160° C. for 15 minutes was carried out. Then, the aluminum alloy foil was cut out in a direction of the rolling. After that, the tensile strength was measured in the same manner as in the above. The tensile strength of 220 MPa or higher was considered acceptable and the tensile strength of less than 220 MPa was determined as unacceptable. With regard to the tensile strength after the heat treatment at 120° C. for 24 hours, at 140° C. for 3 hours, or at 160° C. for 15 minutes, the tensile strength of 190 MPa or higher was considered acceptable and the tensile strength of less than 190 MPa was determined as unacceptable.

<0.2% Yield Strength>

Likewise, a tension test was conducted to determine 0.2% yield strength from a stress/strain curve. The 0.2% yield strength of 180 MPa or higher was considered acceptable and the 0.2% yield strength of less than 180 MPa was determined as unacceptable. With regard to the 0.2% yield strength after the heat treatment at 120° C. for 24 hours, at 140° C. for 3 hours, or at 160° C. for 15 minutes, the 0.2% yield strength of 160 MPa or higher was considered acceptable and the 0.2% yield strength of less than 160 MPa was determined as unacceptable.

<Electrical Conductivity>

With regard to electrical conductivity, electrical resistivity was measured by a four-terminal method, and was converted to electrical conductivity. The electrical conductivity of 58% IACS or higher was considered acceptable and the electrical conductivity of less than 58% IACS was determined as unacceptable.

<Solid Solution Content>

Solid solution content of Fe and Cu were measured as follows. 1.0g of aluminum alloy foil and 50 mL of phenol were heated to 200° C. to dissolve the alloy, followed by addition of 100 mL of benzyl alcohol as an anti-caking agent. The intermetallic compound was separated by filtration, and the filtrate was measured by IPC atomic emission spectrometry.

The intermetallic compound thus separated by filtration was then dissolved by a mixed solution of hydrofluoric acid and hydrochloric acid. Subsequently, the filtrate was measured by ICP atomic emission spectrometry to obtain the amount of Si precipitated as an intermetallic compound. The solid solution content of Si was obtained by deducting the content of precipitated Si from the initial Si content.

<Pinhole Density>

A coil with a width of 0.6 m and a length of 6000 m was made from the aluminum alloy foil which was performed with foil rolling until the foil reaches a thickness of 12 μm, and the number of pinholes was observed using a surface inspection machine. The number of the pinholes observed was divided by the total surface area to give the number of pinholes per 1 $m^2$ unit area. This value was taken as the pinhole density. The pinhole density of less than $2.0 \times 10^{-3}$ pinholes/$m^2$ was considered acceptable and the pinhole density of $2.0 \times 10^{-3}$ pinholes/$m^2$ or more was determined as unacceptable.

<Whether or Not Cut Occurs During Active-Material-Application Step>

Whether or not a cut occurred in a positive electrode material applied during an active-material-application step was visually inspected. The case without a cut was considered acceptable, and the case with a cut was determined as unacceptable.

<Whether or Not Active Material Detaches>

The presence or absence of the active material detachment was visually inspected. When no detachment occurred, the case was considered acceptable. When at least a part of the active material was detached, the case was determined as unacceptable.

In Examples 1 to 14, there was no occurrence of the active material detachment or a cut during the active-material-application step. In addition, their electrical conductivity was high. Thus, good evaluation results were achieved. It should be noted that, in Example 5 where intermediate annealing was performed, electrical conductivity was sufficiently high, however, strength was somewhat lower than the other Examples. In addition, when Examples 9 and 10 were compared, setting the end-point temperature of the hot rolling to be 285° C. or lower was found to increase the strength of the aluminum alloy foil.

In Comparative Example 15, the high content of Si resulted in insufficient electrical conductivity and too high work hardening, thereby causing cut during foil rolling and generation of many pinholes.

In Comparative Example 16, the high content of Fe resulted in insufficient electrical conductivity and caused generation of many pinholes.

In Comparative Example 17, the low content of Fe and the low solid solution content of Fe resulted in insufficient strength before and after heat treatment at 120° C. for 24 hours, at 140° C. for 3 hours, or at 160° C. for 15 minutes, thereby causing cut during the active material application step and detachment of the active material.

In Comparative Example 18, the high content of Cu and the high solid solution content of Cu resulted in too high work hardening, thereby causing cut during foil rolling.

In Comparative Example 19, the high content of Mn resulted in low electrical conductivity.

In Comparative Example 20, the low content of Cu and the low solid solution content of Cu resulted in insufficient strength before and after heat treatment at 120° C. for 24 hours, thereby causing cut during the active material application step and detachment of the active material.

In Comparative Example 21, the low temperature of the hot rolling resulted in low solid solution content of Fe, insufficient strength before and after heat treatment at 120° C. for 24 hours, at 140° C. for 3 hours, or at 160° C. for 15 minutes, thereby causing cut during the active material application step and detachment of the active material.

In Comparative Example 22, the low temperature of the homogenizing treatment resulted in low solid solution content of Fe, insufficient strength before and after heat treatment at 120° C. for 24 hours, or at 140° C. for 3 hours, thereby causing cut during the active material application step and detachment of the active material.

In Comparative Example 23, the short holding time for the homogenizing treatment resulted in low solid solution content of Fe, insufficient strength before and after heat treatment at 120° C. for 24 hours, at 140° C. for 3 hours, or at 160° C. for 15 minutes, thereby causing cut during the active material application step and detachment of the active material.

In Comparative Example 24, the high end-point temperature of the hot rolling resulted in recrystallization of the aluminum sheet after the hot rolling, insufficient strength before and after heat treatment at 120° C. for 24 hours, at 140° C. for 3 hours, or at 160° C. for 15 minutes, thereby causing cut during the active material application step and detachment of the active material.

The invention claimed is:

1. An aluminum alloy foil for electrode current collector, manufactured by the process including:
   maintaining an aluminum alloy ingot at 550 to 620° C. for 1 to 20 hours, wherein the aluminum alloy ingot comprises 0.1 to 0.5 mass % (hereinafter referred to as %) of Fe, 0.01 to 0.3% of Si, 0.01 to 0.2% of Cu, 0.01% or less of Mn, with the rest consisting of Al and unavoidable impurities; and
   subjecting the resulting ingot under a hot rolling with a starting temperature of 500° C. or higher and an end-point temperature of 255 to 300° C., wherein
   tensile strength of the aluminum alloy foil is 220 MPa or higher, 0.2% yield strength of the aluminum alloy foil is 180 MPa or higher, electrical conductivity of the aluminum alloy foil is 58% International Annealed Copper Standard (IACS) or higher, a solid solution of Fe formed in the aluminum alloy foil is 100 ppm or higher, a solid solution of Si formed in the aluminum alloy foil is 80 to 1800 ppm, and a solid solution of Cu formed in the aluminum alloy foil is 80 to 1500 ppm.

2. The aluminum alloy foil for electrode current collector of claim 1, wherein
   the tensile strength and the 0.2% yield strength after performing either one of heat treatments of 24 hours at 120° C., 3 hours at 140° C., or 15 minutes at 160° C., is 190 MPa or higher and 160 MPa or higher, respectively.

* * * * *